(12) United States Patent
Wiker et al.

(10) Patent No.: US 11,607,792 B2
(45) Date of Patent: Mar. 21, 2023

(54) MACHINE TOOL DEVICE

(71) Applicant: Robert Bosch GmbH, Stuttgart (DE)

(72) Inventors: Juergen Wiker, Stuttgart (DE); Daniel Dennis, Nuertingen (DE); Matthias Schneider, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 16/649,922

(22) PCT Filed: Sep. 14, 2018

(86) PCT No.: PCT/EP2018/074940
§ 371 (c)(1),
(2) Date: Jul. 10, 2020

(87) PCT Pub. No.: WO2019/057637
PCT Pub. Date: Mar. 28, 2019

(65) Prior Publication Data
US 2020/0331139 A1 Oct. 22, 2020

(30) Foreign Application Priority Data
Sep. 21, 2017 (DE) ...................... 10 2017 216 698.3

(51) Int. Cl.
*B25F 5/02* (2006.01)
*H02P 3/06* (2006.01)
*H02P 25/14* (2006.01)

(52) U.S. Cl.
CPC .................. *B25F 5/02* (2013.01); *H02P 3/06* (2013.01); *H02P 25/14* (2013.01)

(58) Field of Classification Search
CPC ............... B25F 5/02; H02P 25/14; H02P 3/06
See application file for complete search history.

(56) References Cited

U.S. PATENT DOCUMENTS

| 6,680,596 | B1* | 1/2004 | DeCicco | H01R 39/42 |
| | | | | 388/811 |
| 9,406,915 | B2* | 8/2016 | White | H02J 7/007 |
| 11,047,528 | B2* | 6/2021 | Vanko | F16P 7/02 |
| 2015/0196987 | A1* | 7/2015 | Hayashi | B25B 23/18 |
| | | | | 173/46 |

FOREIGN PATENT DOCUMENTS

| DE | 10 2012 211 580 A1 | 1/2014 |
| DE | 10 2014 010 314 A1 | 1/2015 |
| DE | 10 2017 103 589 A1 | 8/2017 |
| WO | 2016/183419 A1 | 11/2016 |

OTHER PUBLICATIONS

Opto-Isolated 4-Channel Triac Board (Year: 2005).*
International Search Report corresponding to PCT Application No. PCT/EP2018/074940, dated Feb. 12, 2019 (German and English language document) (5 pages).

* cited by examiner

*Primary Examiner* — Daniel Jeremy Leeds
(74) *Attorney, Agent, or Firm* — Maginot, Moore & Beck LLP

(57) ABSTRACT

A machine tool device for a portable machine tool in one embodiments includes at least one coupling unit which couples a machining tool and at least one drive unit configured to drive the coupling unit. The machine tool device includes a recuperation unit which provides, in at least one deactivated state of the drive unit, electrical energy which supplies at least one functional unit from a kinetic energy of at least the coupling unit.

12 Claims, 4 Drawing Sheets

MACHINE TOOL DEVICE

This application is a 35 U.S.C. § 371 National Stage Application of PCT/EP2018/074940, filed on Sep. 14, 2018, which claims the benefit of priority to Serial No. DE 10 2017 216 698.3, filed on Sep. 21, 2017 in Germany, the disclosures of which are incorporated herein by reference in their entirety.

BACKGROUND

There is already known from DE 10 2012 211 580 A1 a power tool device for a power tool, comprising a power tool housing, arranged in which is a drive unit for driving an output shaft that is connected to a tool receiver for receiving an assigned insert tool.

SUMMARY

The disclosure is based on a power tool device for a power tool, in particular a portable power tool, having at least one coupling unit for coupling a work tool, and having at least one drive unit for driving the coupling unit.

It is proposed that the power tool device comprise a recuperation unit that, in at least one deactivated state of the drive unit, provides electrical energy to supply at least one function unit from kinetic energy at least of the coupling unit and, in particular, additionally of the work tool.

A "power tool device" is to be understood to mean, in particular, a part, in particular a sub-assembly, of a power tool. A "power tool" is to be understood here to mean, in particular, a machine for performing work on workpieces. The power tool may be of a battery-operated or cable-connected design. In particular, the portable power tool is realized as an oscillation power tool, having a tool, driven in an oscillating manner, that is arranged and/or can be arranged on the oscillation power tool, wherein the tool driven in an oscillating manner can be driven at an oscillation frequency, preferably in a kHz range. Particularly preferably, the power tool is realized as an angle grinder. The power tool may be realized as a battery-operated angle grinder or as a cable-connected angle grinder. In an alternative design, the portable power tool is realized as a power drill or as a power percussion drill. In a further possible design, the portable power tool is realized as a jigsaw, as a chainsaw, as a power sander, as a power plane, as a garden appliance, as a saber saw or the like. However, it is conceivable for the power tool to be of a different design, considered appropriate by persons skilled in the art, such as, for example, designed as an electric plane, as a chisel hammer or as a multifunction power tool. A "portable power tool" is to be understood to mean, in particular, a power tool that can be transported by an operator without the use of a transport machine. The portable power tool has, in particular, a mass of less than 40 kg, preferably less than 10 kg, and particularly preferably less than 5 kg. A "work tool" is to be understood here to mean, in particular, a tool that is arranged and/or that can be arranged, in particular, directly or indirectly on the power tool and that, in at least one operating state, is at least partially in direct contact with at least one workpiece and performs work on the workpiece.

A "drive unit" is to be understood here to mean, in particular, a unit that, by means of energy conversion, in particular conversion of electrical energy into mechanical energy, transmits energy of motion to a further, in particular mechanical unit. The further unit can then be driven, and in particular put into motion. The motion may be, in particular, a rotational motion, a linear motion, an oscillatory motion, or a combination of the said motions. The drive unit may be realized as an electric motor, or part of an electric motor. A "coupling unit" is to be understood here to mean, in particular, a unit designed to couple the drive unit and a work tool, arranged on the power tool, to each other. In particular, the coupling unit is designed to enable a power and/or a torque to be transmitted between at least two units, assemblies and/or elements.

A "recuperation unit" is to be understood to mean, in particular, a unit designed to recover energy, wherein in particular a passive form of energy is converted into an actively used form of energy. In particular, the recuperation unit can function as a generator, and convert a mechanical form of energy into an electrical form of energy. The mechanical form of energy in this case can be stored, in particular as kinetic energy, in a rotational motion of the motor and/or of other moving elements connected to the motor. An "actively used form of energy" is to be understood here to mean, in particular, a form of energy that can be used by units of the power tool device, preferably by a function unit. A "passive form of energy" is to be understood here to mean, in particular, a form of energy of the drive unit that is present in a deactivated state of the drive unit, wherein an in particular external, in particular electrical, energy supply to the drive unit, in particular by an electrical alternating-current power supply system, an alternating or direct voltage source, an alternating or direct current source, for example by means of accumulators and/or batteries, is interrupted. "Energy recovery" is to be understood to mean, in particular, a process in which a form of energy that is not actively used is converted into an actively usable form of energy. A "deactivated state of the drive unit" is to be understood here to mean, in particular, an operating state of the drive unit in which the drive unit is without energy supply, wherein no active flow of electrical energy, in particular from an alternating-current power supply system, or other source of electrical energy, to an energy supply of the drive unit, and simultaneously of a function unit, is effected at least over a period of time after which the function unit is in such a state without energy supply, such that no active function of the function unit, in particular no braking function, can be executed. In particular, in the deactivated state the drive unit executes a continuously decelerating motion, the kinetic energy, in particular of the drive unit, being converted into another form of energy.

A "function unit" is to be understood here to mean, in particular a unit that provides at least one function for the power tool, in particular the power tool device, and that, in particular, may be part of the power tool device. "Designed" is to be understood to mean, in particular, specially programmed, specially configured and/or specially equipped.

The design of the power tool device according to the disclosure makes it possible, advantageously, to provide a mains-autonomous braking function independently of an energy supply of a function unit that provides the braking function. Advantageously, multifunctional electronic components are used in provision of the mains-autonomous braking function, in particular independently of an external electrical energy supply.

Advantageously, the power tool device comprises the function unit that, in the deactivated state of the drive unit, provides at least one function. In particular, the function unit can be functional in the deactivated state, in that the function unit provides functions for the power tool. In particular, the function unit may have a plurality of units that, in particular, can execute a respective function. In this way, functions can be executed both in the activated and preferably in the deactivated state of the drive unit. In particular, functions can be provided exclusively for the deactivated state.

It is additionally proposed that the function be a safeguard function and/or a convenience function. The safeguard function is designed, in particular, to protect an operator, the power tool, a power tool component, the work tool arranged on the power tool, objects and/or persons in the immediate vicinity and/or persons from damage or harm caused by the power tool and/or by the power tool component and/or by the work tool. In particular, the safeguard function may have an emergency switch-off function, a switch-over function, a temperature safeguard function, a work-tool safeguard function, and/or other safeguard function considered appropriate by persons skilled in the art. The convenience function is designed to enable convenient and/or time-saving and/or effort-saving operation of the power tool, in particular during a braking and/or startup operation. Particularly preferably, the safeguard function and/or the convenience function provide/provides a braking function that, in particular, brakes the coupling unit and/or the work tool, at least in the deactivated state. This can advantageously improve the operating safety of the power tool and/or enable a particularly convenient operation of the power tool. In particular, the operator can be protected particularly advantageously against injuries caused by the power tool and/or by the work tool arranged on the power tool. In particular, protection can advantageously be ensured even if an energy supply to the power tool device and/or the power tool is interrupted. In particular, advantageously, it is possible to achieve a saving of working time and/or a reduction in the effort expended, and convenience in the operation of the power tool by the operator.

Furthermore, it is proposed that the function unit comprise a braking unit for braking at least the coupling unit and/or the work tool. Preferably, the braking unit is designed to execute a braking operation, in which braking of the coupling unit and/or of the work tool, relative to the power tool housing, is effected. In particular, the drive unit and/or the recuperation unit may be able to be braked relative to the power tool housing. In particular, the braking unit and the coupling unit may be realized at least partially as one piece. That two units are realized "at least partially as one piece" is to be understood to mean, in particular, that the units have at least one element that is a constituent part, in particular a functionally important constituent part, of both units. The braking of the coupling unit and/or of the work tool, and in particular of the drive unit, may be effected by conversion of the kinetic energy of the coupling unit and/or of the work tool, and in particular of the drive unit, into electrical energy, and then into thermal energy, wherein the thermal energy can be generated by internal resistances of electrical lines and/or electrical components of the power tool device, in particular of the drive unit and/or coupling unit and/or recuperation unit and/or braking unit, and can be dissipated as, ohmic loss, to surroundings. This advantageously enables the coupling unit and/or the work tool to be braked in a selective manner.

Furthermore, it is proposed that the function unit have a control unit for at least partial automatic open-loop and/or closed-loop control of an adaptable braking function of the braking unit. A "control unit" is to be understood to mean, in particular, a unit having at least one set of control electronics. A "set of control electronics" is to be understood to mean, in particular, a unit having a processor unit and having a memory unit, and having an operating program stored in the memory unit. In particular, at least the braking function of the braking unit can be automatically adapted by means of the open-loop and/or closed-loop control unit. In particular, the coupling unit and/or the work tool can be braked to an almost complete standstill of the coupling unit and/or of the work tool, the energy of motion of the coupling unit and/or of the work tool being at least substantially completely converted into another form of energy. It is conceivable that the coupling unit and/or the work tool can be partially braked for a short time, by braking pulses. It is also conceivable for the braking function to have an even, continuous characteristic profile. A particularly advantageous braking operation that is adapted to operating and safety requirements, as well as to operator and operating convenience requirements, can thus be effected. Advantageously, increased operating safety and improved operating convenience during a braking operation of the power tool can be achieved.

It is additionally proposed that the drive unit and the braking unit be realized at least partially as one piece with each other. This advantageously enables costs to be reduced by the use of common components. In addition, a particularly efficient braking operation can be effected. In particular, the braking unit, the coupling unit and the drive unit may be realized at least partially as one piece with each other.

Furthermore, it is proposed that the drive unit and the recuperation unit be realized at least partially as one piece with each other. In particular, the braking unit, the coupling unit, the drive unit and the recuperation unit may be realized at least partially as one piece with each other. This advantageously makes it possible to achieve a reduction of cost by the use of common components. In addition, the servicing requirement can be reduced, due to a smaller number of installed components. Moreover, in particular, a compact structural size can be achieved.

It is additionally proposed that provision of the electrical energy by the recuperation unit be effected independently of an external energy supply. In particular, the recuperation unit may be at least part of the electric motor. The drive unit in an activated state may have a drive mode, and in a deactivated state have a generator mode. The recuperation unit can be automatically activated, in particular, in the generator mode, the recuperation unit being able to generate electrical energy in the form of a direct current. In particular, at least one function of the recuperation unit can be executed without an external energy supply, in particular without an external electric power supply. The function of the recuperation unit is designed, in particular, to supply a unit with the electrical energy. Preferably, the recuperation unit provides the electrical energy at least to the control unit for the purpose of controlling the braking function. Increased operational safety and/or particularly convenient operation of the power tool can thus be achieved.

The power tool device advantageously comprises a monitoring unit for determining a loss of the external energy supply. The monitoring unit may be realized at least partially as one piece with the control unit. Preferably, the control unit comprises the monitoring unit. It is also conceivable that the monitoring unit is realized as a separate unit of the power tool device, and may have one or more components. In particular, the components of the monitoring unit may be multifunctional. "Multifunctional" is to be understood to mean, in particular, that more than one function can be performed by one component and/or one element and/or one unit. In the event of a failure of the external energy supply, in particular as a result of withdrawal of a plug connector of the power tool and/or as a result of severing of an electric power supply cable of the power tool or as a result of failure of the electrical alternating-current supply system from which the power tool is supplied with electrical energy, the monitoring unit may transmit a monitoring signal to the control unit, or directly to another unit. In particular, the monitoring signal may be designed to activate the recuperation unit, directly or indirectly. In this way, a reliable monitoring function of an electric power supply can be provided during operation of the power tool, thus providing an advantageous, in particular convenient, braking, in particular of the work tool.

In a further aspect of the disclosure, which in particular may be considered on its own or also in combination with other aspects of the disclosure, it is proposed that the power tool device have a switching unit that is designed to be used for phase angle control, for switching over between alternating-current operation and direct-current operation, and as a main switch. In particular, the switching unit may be realized at least partially as one piece with the control unit and/or the monitoring unit. The switching unit fulfils, in particular, a triple function. In particular, the switching unit regulates a power consumption of the drive unit during alternating-current operation, in particular of the electric motor, by phase angle control by means of adaptation of an effective supply voltage that is provided for driving the electric motor. Preferably, the switching unit may effect a switch-over between alternating-current operation, in particular when the power tool is supplied from the alternating-current power supply system, and direct-current operation. Preferably, the drive unit and/or the recuperation unit operate/operates as a direct-current generator during direct-current operation. Preferably, the generated direct current is designed to supply the control unit and/or the switching unit and/or the monitoring unit and/or other units of the tool device with the electrical energy, in particular for the purpose of providing the braking function. In addition, the switching unit provides, in particular, a function of a main switch. The switching unit as main switch interrupts, in particular, the supply of electrical energy to the drive unit. Preferably, the switching unit replaces a mechanical main switch of the power tool. The switching unit may comprise one or more electronic components, preferably line components, in particular triacs. Preferably, the switching unit consists of two triacs. It is thereby possible to achieve a reduction of cost, and a reduced susceptibility of the power tool device to faults, by use of fewer installed electronic components.

The power tool device advantageously comprises a current sensor unit that is designed to measure a motor current in at least one activated state of the drive unit, to measure a braking current in at least one deactivated state of the drive unit, and for diagnosis of the switching unit. An "activated state of the drive unit" is to be understood here to mean, in particular, an operating state of the drive unit in which an energy supply for the drive unit is effected over a time period of at least one microsecond, preferably one millisecond, at least substantially via an external energy supply, in particular from an alternating-current supply system. An "activated state of the drive unit" is to be understood here to mean, in particular, an operating state of the drive unit in which the drive unit is supplied with electrical energy, wherein an active flow of electrical energy, in particular from an alternating-current supply system or other electrical energy source, to an energy supply of the drive unit, and simultaneously of a function unit, is effected at least over a period of time from which the function unit is in such an energy-supplied state, such that an active function of the function unit, in particular a braking function, can be executed. In particular, the drive unit executes a motion in the activated state, the energy provided by the external energy supply being actively converted into energy of motion of the drive unit.

In particular, the current sensor unit acquires the motor current, or a characteristic variable, correlated with the motor current, that in particular can be transmitted to the control unit. The current sensor unit may be realized as part of the control unit. Preferably, the current sensor unit may perform a semiconductor diagnosis, in particular of the electronic switch. In particular in this case, the state parameters of the triacs can be acquired. In particular, in alternating-current operation the current sensor unit is connected in series to the drive unit, in particular to an armature connection of the electric motor, and to a connection, in particular a neutral conductor connection, to the alternating-current power supply system. In direct-current operation, the current sensor unit acquires a braking current that can be generated by the drive unit, in particular by the recuperation unit, preferably from the kinetic energy of the electric motor. In direct-current operation, the current sensor unit is in series, in particular, with the armature connection of the electric motor and with the field windings of the electric motor. In this way, costs can be reduced due to a smaller number of components, and due to space saving. This allows continuous monitoring and subsequent adaptation of the motor current and braking current in a controlled manner, and also allows functionality checking of the electrical switching unit.

In a further aspect of the disclosure, which in particular may be considered on its own or also in combination with other aspects of the disclosure, it is proposed that the power tool device have a voltage transformer unit that, in at least one activated state of the drive unit, can be supplied with electrical energy from an external alternating-current power supply system and that, in the deactivated state of the drive unit, can be supplied with electrical energy by the recuperation unit. Preferably, the voltage transformer unit is realized comprises as a negative voltage regulator that, preferably, functions according to the isolating transformer principle. In particular, the voltage transformer unit is designed for negative regulation of an output voltage and for the provision of electrical energy, in particular for a function unit.

In particular, the voltage regulator generates an isolated auxiliary voltage to supply individual electronic components. Preferably, the voltage transformer unit is realized as a non-insulated voltage transformer unit. This makes it possible to dispense with the costly and component-intensive galvanic isolation of an alternating-current circuit and a braking-current circuit. It is thereby possible to achieve production that makes savings of costs and structural space. In particular, it is thus possible to dispense with an additional insulated power supply unit as part of the voltage transformer unit.

Also proposed is a method for operating a power tool device comprising a coupling unit for coupling a work tool, and comprising a drive unit for driving the coupling unit, wherein, in at least one deactivated state of the drive unit, electrical energy, for supplying at least one function unit, is provided from kinetic energy at least of the coupling unit. By means of the method according to the disclosure it is advantageously possible, in particular, to provide a mains-autonomous, and in particular convenient, braking function, independently of an energy supply of a function unit that provides the braking function. Advantageously, multifunctional electronic components are used in provision of the mains-autonomous braking function, in particular independently of an external electrical energy supply.

The power tool device according to the disclosure and the method for operating the power tool device are not intended in this case to be limited to the application and embodiment described above. In particular, the power tool device according to the disclosure and the method for operating the power tool device may have individual elements, component parts and units, and method steps, that differ in number from a number stated herein, in order to fulfill an operating principle described herein. Moreover, in the case of the value ranges specified in this disclosure, values lying within the stated limits are also to be deemed as disclosed and applicable in any manner.

BRIEF DESCRIPTION OF THE DRAWINGS

Further advantages are disclosed by the following description of the drawing. The drawing shows an exemplary embodiment of the disclosure. The drawings and, the description contain numerous features in combination. Persons skilled in the art will also expediently consider the features individually and combine them to create appropriate further combinations.

There are shown.

DETAILED DESCRIPTION

Figure 1:
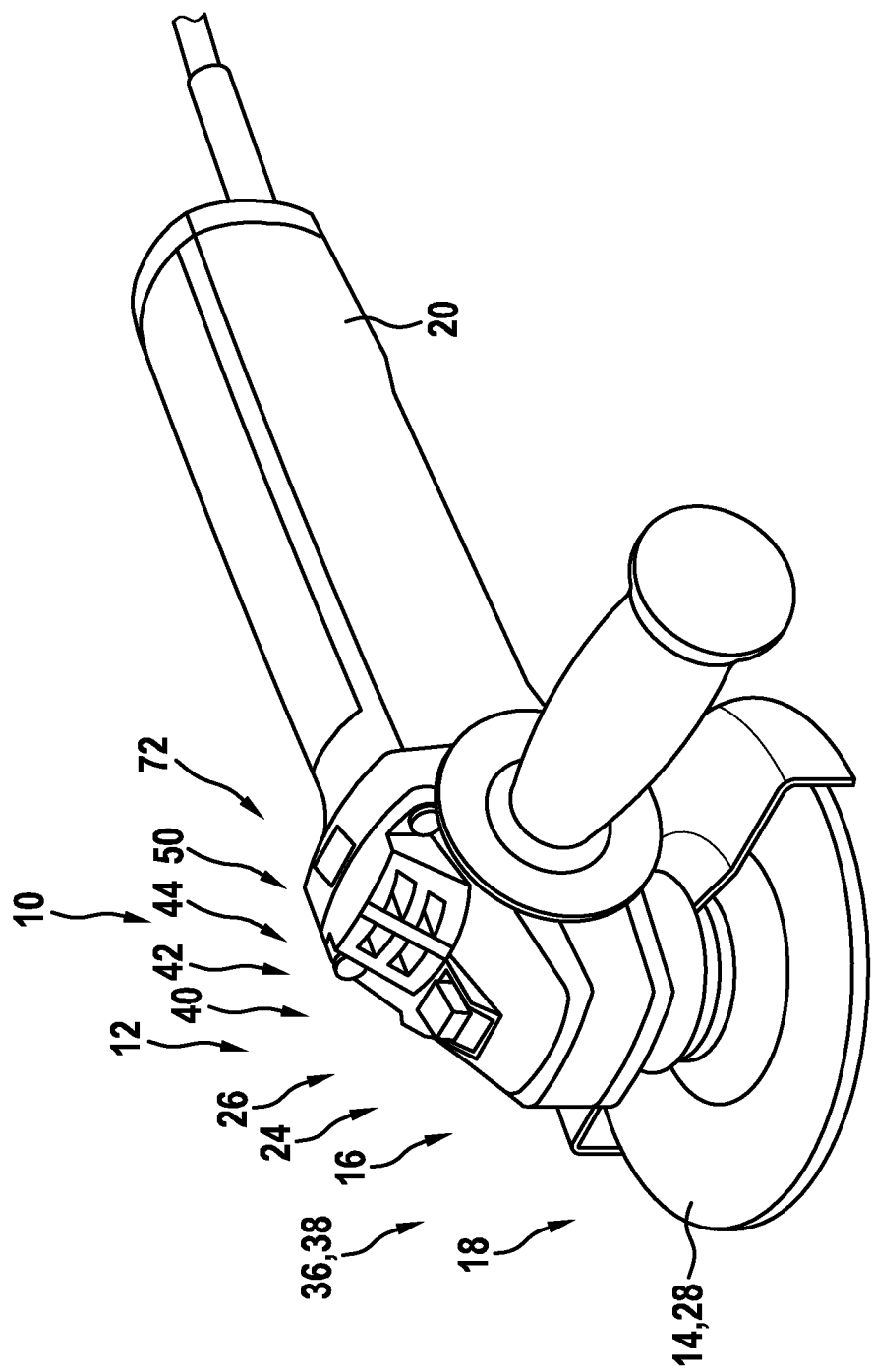
FIG. 1 a portable power tool, with a power tool device, in a schematic view.

FIG. 1 shows a portable power tool 12, having at least one power tool device 12. The power tool 10 is realized as an angle grinder. There is a work tool 14 arranged on the power tool 10. The work tool 14 is realized as a cutting or grinding disk. The power tool has a power tool housing 20.

The power tool 10 comprises a drive unit 16 that, in at least one operating state, drives the work tool 14. The drive unit 16 is arranged, at least partially, in the power tool housing 20. The drive unit 16 is designed to drive the work tool 14 in rotation via a coupling unit 18 of the power tool device 12. The drive unit 16 is realized as an electric motor 26, in particular as a universal electric motor. The coupling unit 18 is arranged, at least partially, in the power tool housing 20. The drive unit 16 and the coupling unit 18 are realized at least partially as one piece.

The power tool device 12 has a recuperation unit 24. The recuperation unit 24 is designed to provide electrical energy in a deactivated state of the drive unit 16, the electrical energy being able to be generated from kinetic energy, at least of the coupling unit 18 and of the work tool 14, for the purpose of supplying a function unit 36 of the power tool device 12. The kinetic energy is stored, in the form of motion, in moving components of the coupling unit 18 and/or of the electric motor 26 and/or, in the case of a power tool 10 realized as an angle grinder, also in the cutting or grinding disk 28. The recuperation unit 24 and the electric motor 26 are realized partially as one piece. The recuperation unit 24 comprises an armature 30 and field windings 32, 34. A portion of the kinetic energy is contained in a rotating part of the electric motor 26, specifically the armature 30.

Generation of the electrical energy by means of the recuperation unit 24 is effected independently of an external energy supply, in particular an external electric power supply, by means of a connection, in particular to an alternating-current power supply system 90. If the external electric power supply is interrupted by intentional switching-off of the power tool 10, by withdrawal of a mains plug or as a result of an electric power supply failure, the recuperation unit 24 provides the electrical energy for the function unit 36. In the deactivated state of the drive unit 16, the function unit 36, supplied with the electrical energy, provides at least one function, namely a safeguard function. The safeguard function in this case includes a braking function, by which the coupling unit 18 and the work tool 14 are braked.

The function unit 36 comprises a braking unit 38. The braking unit 38 and the drive unit 16 are realized at least partially as one piece with each other. The braking unit 38 is designed to brake at least the coupling unit 18 and the work tool 14. In addition, the braking unit 38 is also designed to brake the drive unit 16, in particular the armature 30 of the electric motor 26. The braking unit 38 comprises all electrical lines and components having an ohmic resistance in an electrical circuit, through which a braking current flows in direct-current operation and which generate a Joule heat. The braking unit 38, the drive unit 16, the recuperation unit and the function unit 36 are realized at least partially in one piece with each other.

The function unit 36 comprises a control unit 44 for at least partial automatic open-loop and/or closed-loop control of the adjustable braking function of the braking unit 38. The control unit 44 has a monitoring unit 40. The monitoring unit 40 is designed to determine a loss of the external energy supply.

Figure 2:
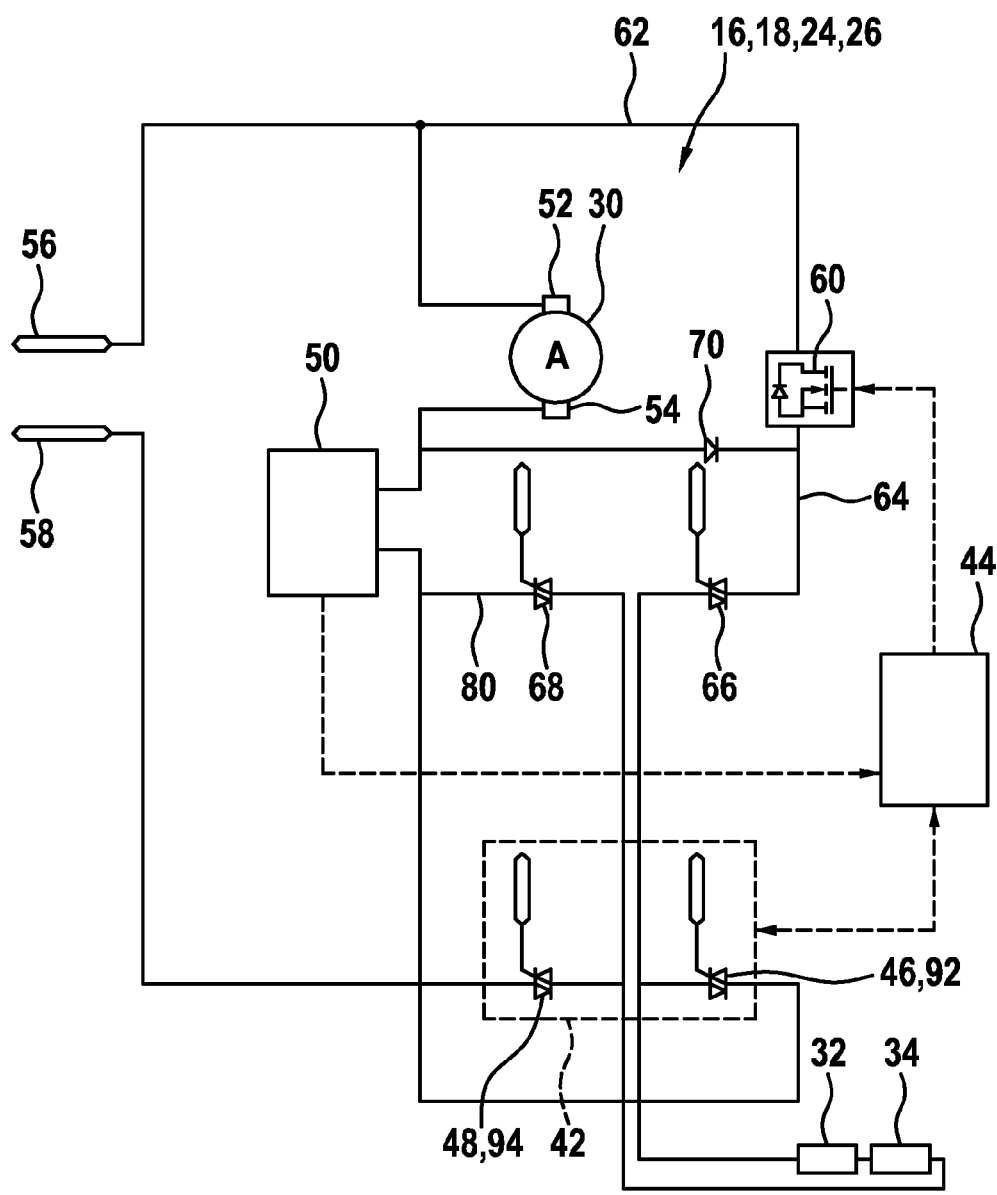
FIG. 2 a schematic representation of the power tool device, with a set of braking electronics, FIG. 3 the power tool device, with a voltage transformer unit and the input-side circuit configuration thereof, and FIG. 4 a flow diagram of a method for operating the power tool device

The power tool device 12 has a switching unit 42 (see FIG. 2). The switching unit 42 is part of the control unit 44. The switching unit 42 comprises two semiconductor elements 92, 94. Preferably, the semiconductor elements 92, 94 are realized as triacs 46, 48. When the drive unit 16 is in the activated state, the switching unit 42 adapts a power consumption of the electric motor 26, by means of phase angle control. During the phase angle control, an effective voltage that is applied to the electric motor 26 can be adapted. The function of the phase angle control may also be realized with only one triac, with the other triac being in a triggered state. In addition, the switching unit 42 is designed to switch over between an alternating-current operation and direct-current operation. A switch-over is effected after the monitoring unit 40 has transmitted a signal to the control unit 44. The control unit 44 transmits a control signal to the switching unit 42. In the event of loss of the external energy supply, the switching unit 42 switches the power tool device 12 from alternating-current operation to direct-current operation. Moreover, the switching unit 42 is realized as a main switch for the power tool 10, with no need for further semiconductor elements. The switching unit 42 replaces a mechanical main switch that isolates the power tool 10 from an external energy supply. The switching unit 42 executes all three functions of phase angle control, switch-over and main switch.

The power tool device 12 has a current sensor unit 50 (see FIG. 2). The current sensor unit 50 is part of the control unit 44. The current sensor unit 50 fulfils at least one triple function. In alternating-current operation, the current sensor unit 50 measures a motor current that flows through the electric motor 26. The motor-current characteristic variable represents a power consumption, and therefore also a provided power, of the electric motor 26. The current sensor unit 50 transmits the motor-current characteristic variable to the control unit 44.

In direct-current operation, the current sensor unit 50 measures a braking current. A braking-current variable is correlated with the electrical energy obtained from the kinetic energy of the coupling unit 18 and/or of the drive unit 16. In addition, the current sensor unit 50 performs a semiconductor diagnosis of the semiconductor components of the switching unit 42, in particular of the triacs 46, 46. The current sensor unit 50 transmits a respective signal to the control unit 44 for further processing (see FIG. 2). In alternating-current operation, the current sensor unit 50 is connected in series to the switching unit 42, via the second connection.

In alternating-current operation, electric power is supplied to the electric motor 26 and the power tool device 12 via two mains power connections 56, 58. The current flows from the first mains power connection 56 to a first armature connection 52 of the electric motor 25. A second armature connection 54 is connected to a first connection of the current sensor unit 50. A second connection of the current sensor unit 50 is connected, via a first connection of the switching unit 42, to a first triac 46 of the switching unit 42. The current then passes, through field windings 32, 34 of the electric motor 26, to a second triac 48 of the switching unit 42. The second connection of the switching unit 42 is connected to the second mains power connection 58.

In direct-current operation, electric power is supplied to the power tool device 12 by the recuperation unit 24, the electric motor 26 functioning as a direct-current generator. When a MOSFET 60 is in a conducting state, a braking current flows from the first armature connection 52 of the electric motor 26, via a line 62, to the MOSFET 60. The MOSFET 60 is designed to regulate the braking current, the MOSFET 60 influencing a flow of braking current by means of a control voltage. The braking current flows on, via a line 64, to a first further triac 66, and passes, via the field windings 32, 34, to a second further triac 68. The second further triac 68 is connected to the second connection of the current sensor unit 50. The first further and the second further triac 66, 68 are designed to make a braking circuit conductive by their positioning in the braking circuit. In addition, the other triacs 66, 68 shield the brake circuit during alternating-current operation. The current sensor unit 50 is connected, via the second connection, to the second armature connection 54 of the electric motor 26.

When the MOSFET 60 is in a non-conducting state, the recuperation unit 24 is isolated from the braking circuit. When the MOSFET 60 is in a non-conducting state, the braking current is generated after the MOSFET 60 is switched off, due to self-induction, a magnetic field of the field windings 32, 34 providing energy for an induction voltage. The braking current flows from the field windings 32, 34, via the second further triac 68, to the second connection of the current sensor unit 50, via a line 80, to a free-wheeling diode 70. The braking current then flows, via the first further triac 66, back to the field windings 32, 34. Internal resistances of the braking circuit, for example an internal wire resistance of the lines and field windings 32, 34 of the electric motor 26, convert the electrical energy into heat, both in the conducting state and in the non-conducting state of the MOSFET 60. The control unit 44 monitors and controls the MOSFET 60 by applying a suitable gate voltage, thus switching the conducting and non-conducting states of the MOSFET 60. The MOSFET 60, as an element that limits braking current, can be replaced by other active semiconductor elements, for example by IGBT, or other current limiting elements considered appropriate by persons skilled in the art.

Figure 3:
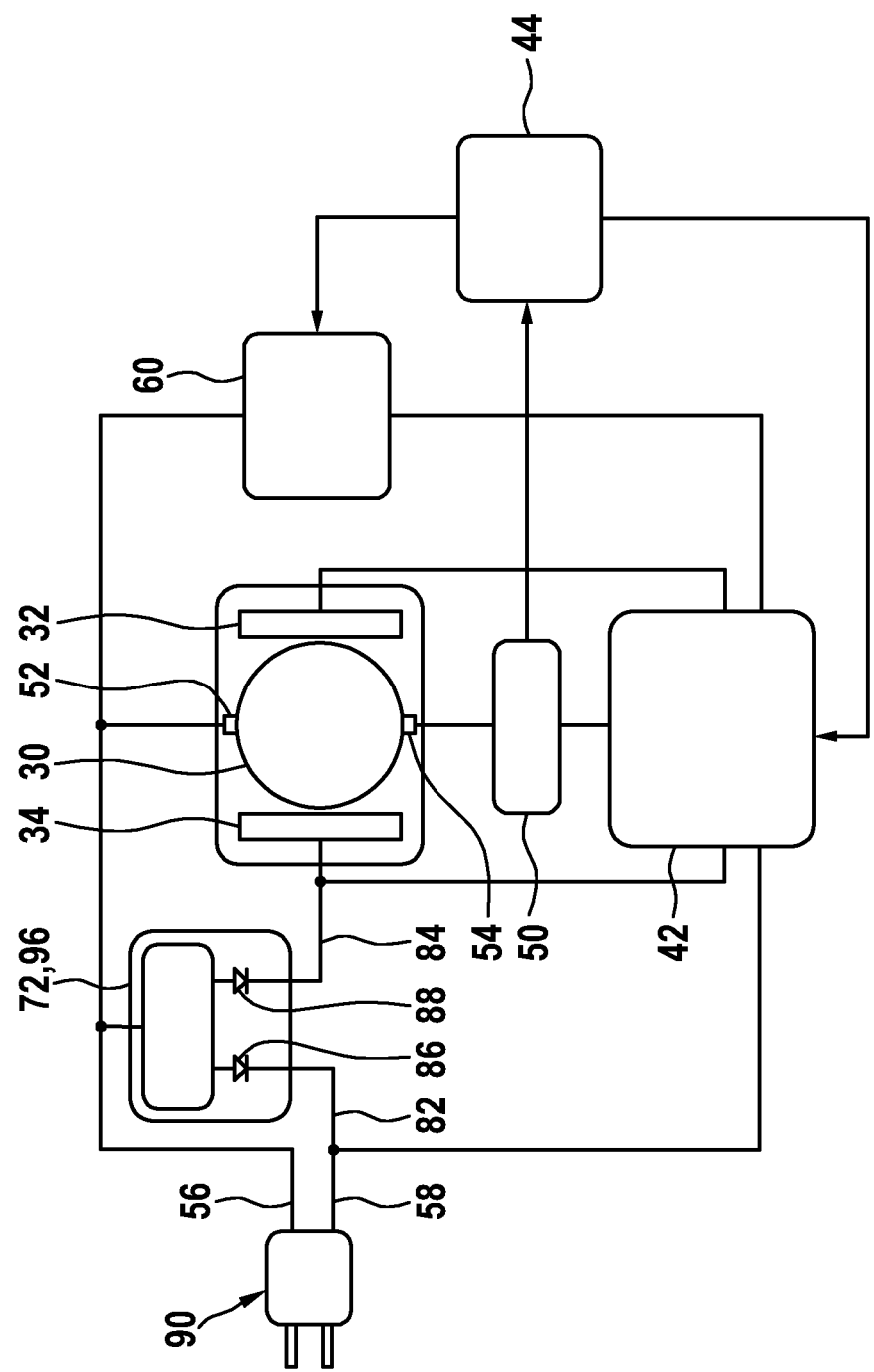

FIG. 3 shows an input-side circuit configuration of a voltage transformer unit 72 of the power tool device 12. The power tool device 12 comprises the voltage transformer unit 72. The voltage transformer unit 72 comprises a negative voltage regulator 96. In particular, the voltage regulator 96 operates according to the isolating transformer principle. The voltage regulator 96 is non-insulated and has a negatively regulated voltage output. The voltage regulator 96 is supplied on the input side via a negative mains half-wave of an alternating-current voltage in alternating-current operation, and via a negative direct-current voltage in direct-current operation. In particular, the voltage regulator 96 generates an isolated auxiliary voltage to a supply and/or to a control the MOSFET 60.

The voltage transformer unit 72 is designed to supply the function unit 36, and in particular the control unit 44, with electrical energy. The voltage transformer unit 72 provides a suitable operating voltage for the function unit 36. The voltage transformer unit 72 can be supplied both by the external energy supply, in alternating-current operation, from the alternating-current power supply system 90, and in direct-voltage operation, with a direct current.

In alternating-current operation, the first mains power connection 56 is provided, as a first reference point, and the second mains power connection 58, as a second reference point, with a sufficient potential difference for connection of the voltage transformer unit 72 to the electrical power supply.

In direct-current operation, the second reference point can be realized in the form of a negative potential. The negative potential is created at the first armature connection 52 of the electric motor 26. The first reference point is created by directly connecting the second armature connection 54 of the electric motor 26 to the first reference point. Thus, the voltage transformer unit 72 is connected to two reference points with a sufficiently large potential difference. In direct-current operation, the electric motor 26 and/or the recuperation unit 24 generate/generate the sufficiently large potential difference between the first and the second reference point in the absence of an external power supply.

The voltage transformer unit 72 has two diodes 86, 88. The diodes 86, 88 are designed to connect the voltage transformer unit 72 to a negative potential. In alternating-current operation, the diode 86 establishes a connection of the voltage transformer unit 72 to the second mains power connection by means of an electrical line 82. By means of the diode 88, in direct-current operation the second reference point is connected to the negative potential at the first armature connection 52 by a line 84. It is also conceivable to replace the diodes 86, 88 by other electronic components that are basically suitable for logic circuits.

This makes it possible to generate non-isolated voltages on the input and output sides with respect to the voltage transformer unit 72 without galvanic isolation of the circuits, namely of the alternating-current circuit and the braking circuit.

Figure 4:
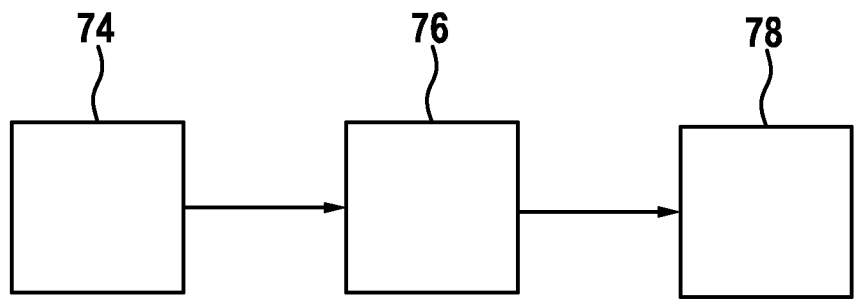

FIG. 4 shows a flow diagram of a method for operating a power tool device 12. The method comprises at least one first method step 74, in which an interruption of an external supply to the power tool device 12 is identified by means of the monitoring unit 40. The interruption of the external energy supply may be effected as a result of manual switch-off of the power tool 10, or isolation of the electrical connection of the power tool 10 from the external alternating-current power supply system 90, for example as a result of withdrawal of a plug connector or severing of an electric supply cable of the power tool 10, or a breakdown of the external alternating-current power supply system 90.

The method comprises at least one second method step 76, in which a switch-over operation, between an alternating-current operation and a direct-current operation of the power tool device 12, is performed. Furthermore, a continuous supply of electrical energy to the power tool device 12 and to the control unit 44 is ensured by means of the voltage transformer unit 72. The electrical energy is generated from kinetic energy of the coupling unit 18 and/or the drive unit 16 and/or of the work tool 14 of the power tool device 12 by means of a recuperation unit 24.

The method comprises at least one third method step 78, in which a braking function of the braking unit 38 is activated by the control unit 44.

The braking function is initiated by the control unit 44 as soon as a signal of the monitoring unit 40 is transmitted to the control unit 44, and the switch-over operation is initiated. The kinetic energy of the drive unit 16 and/or coupling unit 18 is converted into electrical energy and dissipated, in the form of heat produced at electrical resistances, electrical lines, electrical components and/or at other electronic components of the power tool device 12, to surroundings. A braking action, in particular of a work tool 14 arranged on the coupling unit 18, is thereby achieved.

The invention claimed is:

1. A power tool device for a portable power tool, comprising:
   at least one coupling unit configured to couple a work tool;
   at least one drive unit configured to drive the at least one coupling unit;
   a recuperation unit that is configured, in at least one deactivated state of the drive unit, to provide electrical energy to supply at least one function unit using kinetic energy at least of the coupling unit;
   a switching unit designed (i) for phase angle control, (ii) for switching over between alternating-current operation wherein mains electric power is supplied to the power tool device, and direct-current operation wherein mains electric power is not supplied to the power tool device, and (iii) as a main switch: and
   a current sensor unit designed to measure a motor current in at least one activated state of the drive unit, to measure a braking current in the at least one deactivated state of the drive unit, and for diagnosis of the switching unit, wherein:
   the switching unit includes a first triac positioned in electrical series between the current sensor unit and at least one field winding of the at least one drive unit;
   the switching unit includes a second triac positioned in electrical series between the at least one field winding and a first mains power connection of the power tool device;
   the power tool device comprises a third triac positioned in electrical series between an armature of the at least one drive unit and the at least one field winding; and
   the power tool device comprises a fourth triac positioned in electrical series between the at least one field winding and the current sensor unit.

2. The power tool device as claimed in claim 1, wherein the at least one function unit is configured to provide at least one function in the deactivated state of the at least one drive unit.

3. The power tool device as claimed in claim 2, wherein the at least one function comprises at least one of a safeguard function and a convenience function.

4. The power tool device as claimed in claim 2, wherein the at least one function unit comprises a braking unit configured to brake at least one of the coupling unit and the work tool.

5. The power tool device as claimed in claim 4, wherein the function unit has a control unit configured for at least one of partial automatic open-loop and closed-loop control of an adaptable braking function of the braking unit.

6. The power tool device as claimed in claim 4, wherein the drive unit and the braking unit are realized at least partially as one piece with each other.

7. The power tool device as claimed in claim 1, wherein the drive unit and the recuperation unit are realized at least partially as one piece with each other.

8. The power tool device as claimed in claim 1, wherein the recuperation unit is configured to provide the electrical energy independently of an external energy supply.

9. The power tool device as claimed in claim 8, further comprising:
   a monitoring unit configured to determine a loss of the external energy supply.

10. The power tool device as claimed in claim 1, further comprising:
    a voltage transformer unit, wherein the power tool device is configured, in at least one activated state of the drive unit, to supply electrical energy from an external alternating-current power supply system to the voltage transformer unit and configured, in the at least one deactivated state of the drive unit, to supply electrical energy to the voltage transformer unit using the recuperation unit.

11. A portable power tool, comprising:
    at least one power tool device, the at least one power tool device including
    at least one coupling unit configured to couple a work tool,
    at least one drive unit configured to drive the at least one coupling unit,
    a recuperation unit that, in at least one deactivated state of the drive unit, provides electrical energy to supply at least one function unit using kinetic energy at least of the coupling unit, and
    a switching unit designed (i) for phase angle control, (ii) for switching over between alternating-current operation wherein mains electric power is supplied to the power tool device, and direct-current operation wherein mains electric power is not supplied to the power tool device, and (iii) as a main switch, wherein:
    the switching unit includes a first triac positioned in electrical series between a current sensor unit and at least one field winding of the at least one drive unit;
    the switching unit includes a second triac positioned in electrical series between the at least one field winding and a first mains power connection of the power tool device
    the power tool device comprises a third triac positioned in electrical series between an armature of the at least one drive unit and the at least one field winding; and
    the power tool device comprises a fourth triac positioned in electrical series between the at least one field winding and the current sensor unit.

12. A method for operating a power tool device, comprising at least one coupling unit configured to couple a work tool, and at least one drive unit configured to drive the at least one coupling unit the method comprising;

provided phase angle controlled electrical energy to the at least one drive unit using a switching unit as a main switch, the switching unit providing the phase angle control;

storing kinetic energy in at least one of the at least one coupling unit and the work tool; and controlling switching over between alternating-current operation and direct-current operation using the switching unit, thereby terminating the provision of mains electrical energy to the at least one drive unit after storing the kinetic energy, and supplying at least one function unit with energy from a recuperation device using the stored kinetic energy after terminating the provision of electrical energy to the at least one drive unit, wherein:

providing phase angle controlled electrical energy to the at least one drive unit comprises providing phase angle controlled electrical energy to the at least one drive unit through (i) a first triac of the switching unit positioned in electrical series between a current sensor unit and at least one field winding of the at least one drive unit, and (ii) a second triac of the switching unit positioned in electrical series between the at least one field winding and a first mains power connection of the power tool device; and supplying the at least one function unit with energy from the recuperation device using the stored kinetic energy comprises supplying the at least one function unit with energy from the recuperation device through (i) a third triac positioned in electrical series between an armature of the at least one drive unit and the at least one field winding, and (ii) a fourth triac positioned in electrical series between the at least one field winding and the current sensor unit.

* * * * *